US012399494B2

United States Patent
Chen et al.

(10) Patent No.: US 12,399,494 B2
(45) Date of Patent: Aug. 26, 2025

(54) ONBOARD CLUSTER TRACKING SYSTEM

(71) Applicant: WAYMO LLC, Mountain View, CA (US)

(72) Inventors: Mingcheng Chen, Sunnyvale, CA (US); Christian Lauterbach, Campbell, CA (US); Ian Mahon, Berkeley, CA (US); Sachithra Hemachandra, Campbell, CA (US)

(73) Assignee: Waymo LLC, Mountain View, CA (US)

( * ) Notice: Subject to any disclaimer, the term of this patent is extended or adjusted under 35 U.S.C. 154(b) by 1331 days.

(21) Appl. No.: 16/664,203

(22) Filed: Oct. 25, 2019

(65) Prior Publication Data

US 2021/0124351 A1 Apr. 29, 2021

(51) Int. Cl.
*G05D 1/00* (2024.01)
*G07C 5/02* (2006.01)

(52) U.S. Cl.
CPC .............. *G05D 1/0088* (2013.01); *G07C 5/02* (2013.01)

(58) Field of Classification Search
CPC ......... G05D 1/0088; G05D 2201/0213; G07C 5/02; G07C 5/0808
See application file for complete search history.

(56) References Cited

U.S. PATENT DOCUMENTS 8,989,944 B1 * 3/2015 Agarwal ................ G01S 15/86
340/576
9,043,069 B1 5/2015 Ferguson et al.
(Continued)

FOREIGN PATENT DOCUMENTS

JP 2011192141 A 9/2011
JP 2017537484 A 12/2017
(Continued)

OTHER PUBLICATIONS

International Search Report and Written Opinion for Application No. PCTUS2055750 dated Jan. 29, 2021.
(Continued)

*Primary Examiner* — Peter D Nolan
*Assistant Examiner* — Peter Y Ning
(74) *Attorney, Agent, or Firm* — Botos Churchill IP Law

(57) ABSTRACT

The technology relates to tracking objects in an environment around an autonomous vehicle. A computing system of the autonomous vehicle determines accurate motion characteristics of objects detected in its environment despite various sensor measurement limitations. By correcting motion distortion for fast moving objects and accounting for discrepancies in sensor data gathering, motion characteristics may be determined for the detected objects with enhanced accuracy. Multiple sets of correspondences are determined for clusters from multiple sensor spins, enabling better alignment using a surface matching algorithm even when clusters have fewer data points. Efficiency is also enhanced by selecting hypotheses based on confidence levels. These techniques provide for identifying the types of objects for which a yaw rate can be accurately determined. Object classification can also be improved by accumulating associated clusters corresponding to a detected object. In addition, under- or over-segmentation can be mitigated with such techniques.

17 Claims, 15 Drawing Sheets

(56) References Cited

U.S. PATENT DOCUMENTS

| | | | |
|---|---|---|---|
| 10,534,079 B2 * | 1/2020 | Kim | G01S 17/86 |
| 10,657,388 B2 * | 5/2020 | Patil | G05D 1/0246 |
| 10,824,880 B2 * | 11/2020 | Yao | G01S 17/86 |
| 10,921,817 B1 * | 2/2021 | Kangaspunta | G06V 20/56 |
| 11,164,325 B2 * | 11/2021 | Yang | G06T 7/33 |
| 2009/0110301 A1 | 4/2009 | Schopp et al. | |
| 2011/0228979 A1 | 9/2011 | Nishino et al. | |
| 2015/0331111 A1 | 11/2015 | Newman et al. | |
| 2017/0083748 A1 * | 3/2017 | Zhou | G06F 18/211 |
| 2017/0221283 A1 | 8/2017 | Pal et al. | |
| 2017/0248693 A1 | 8/2017 | Kim | |
| 2018/0188043 A1 | 7/2018 | Chen et al. | |
| 2018/0341263 A1 * | 11/2018 | Rust | G05D 1/0253 |
| 2019/0258251 A1 * | 8/2019 | Ditty | G05D 1/0274 |
| 2021/0065473 A1 * | 3/2021 | Diehl | G05D 1/0055 |
| 2021/0116914 A1 * | 4/2021 | Ren | G06V 20/58 |
| 2021/0331815 A1 * | 10/2021 | Wang | G06F 30/15 |

FOREIGN PATENT DOCUMENTS

| | | |
|---|---|---|
| KR | 101824982 B1 | 2/2018 |
| WO | 2017041303 A1 | 3/2017 |

OTHER PUBLICATIONS

Decision to Grant for Japanese Patent Application No. 2022-514999, Mar. 17, 2024, 3 Pages.
Extended European Search Report for corresponding Application No. 20878552.7 dated Aug. 23, 2023 (9 pages).

* cited by examiner

180

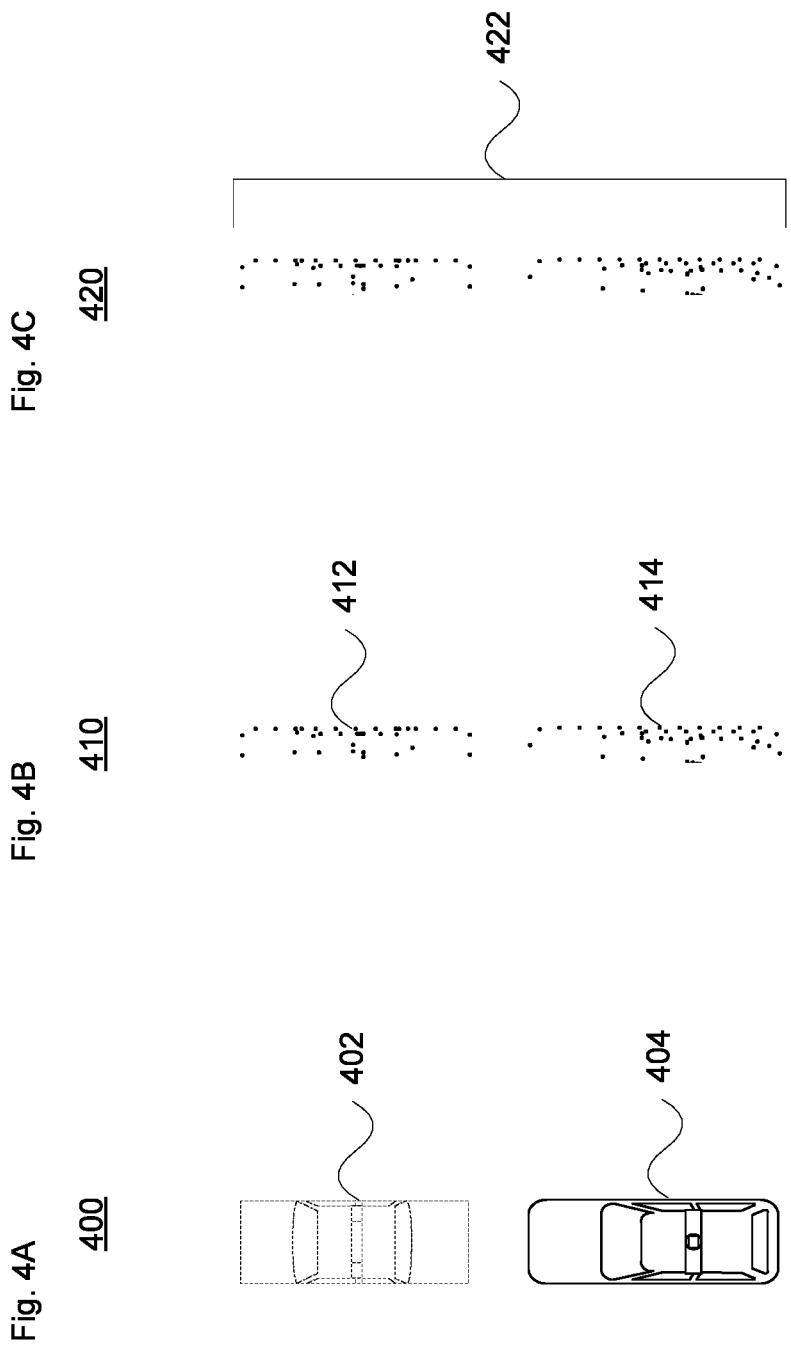

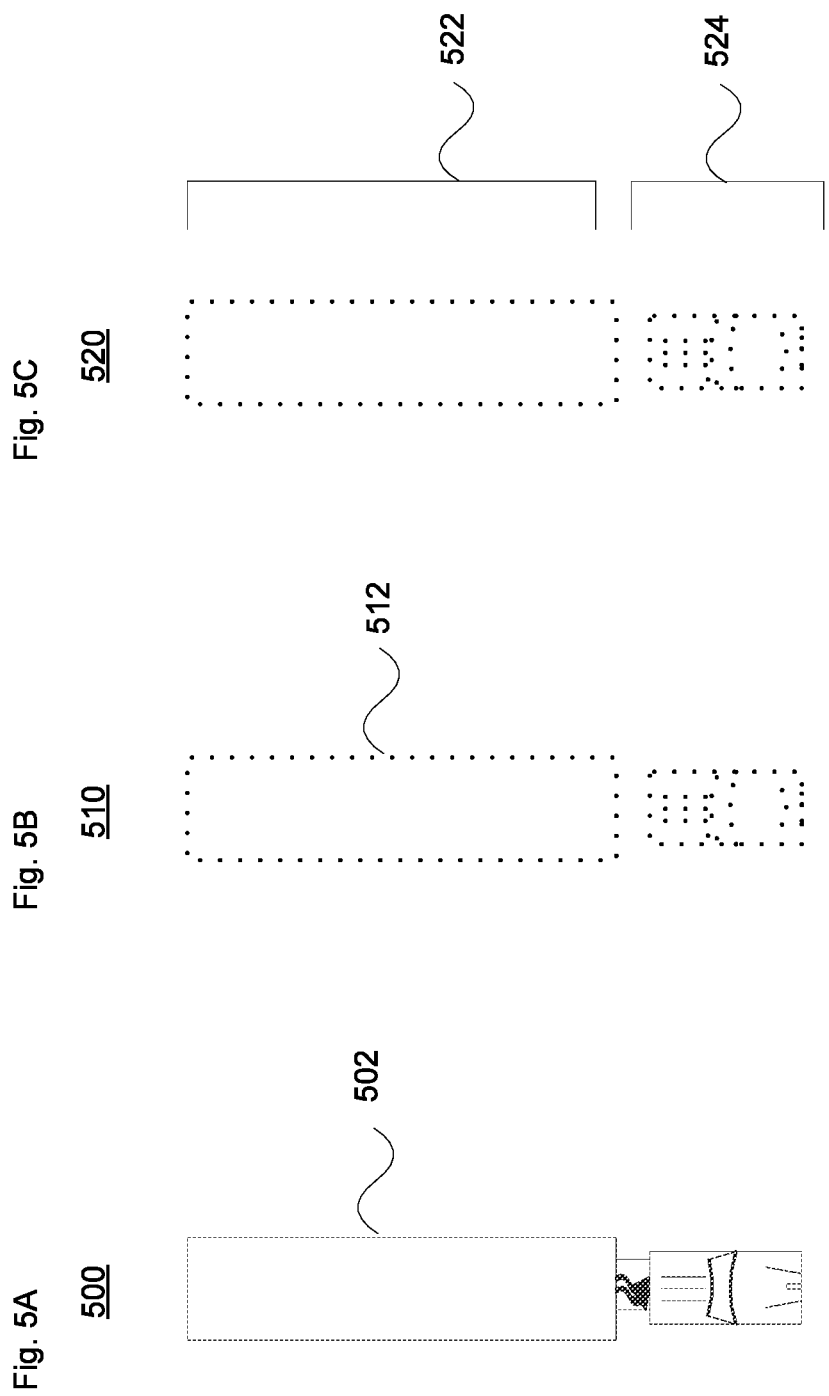

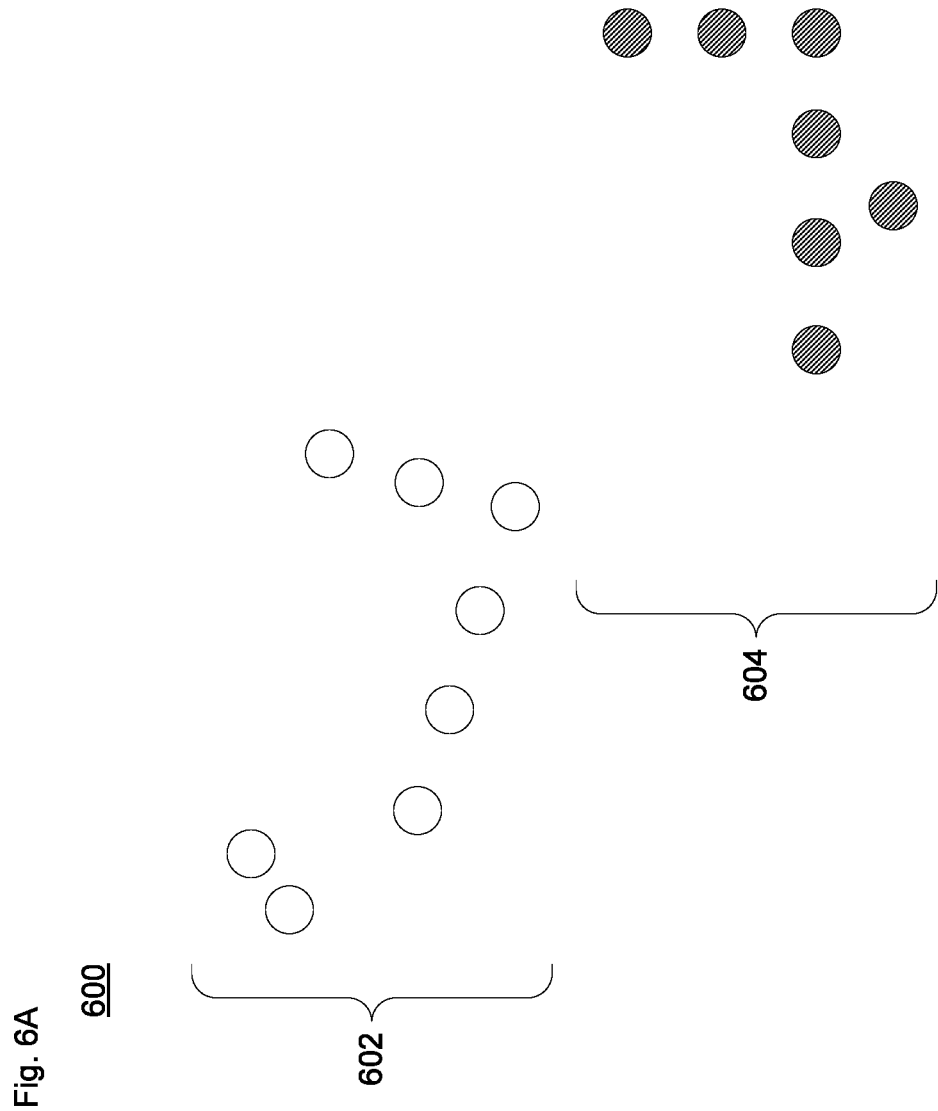

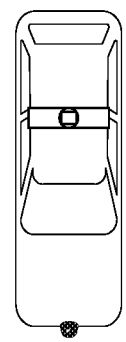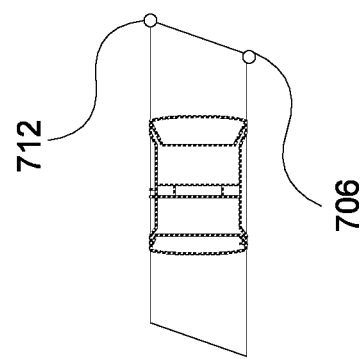
Fig. 7C 720

800

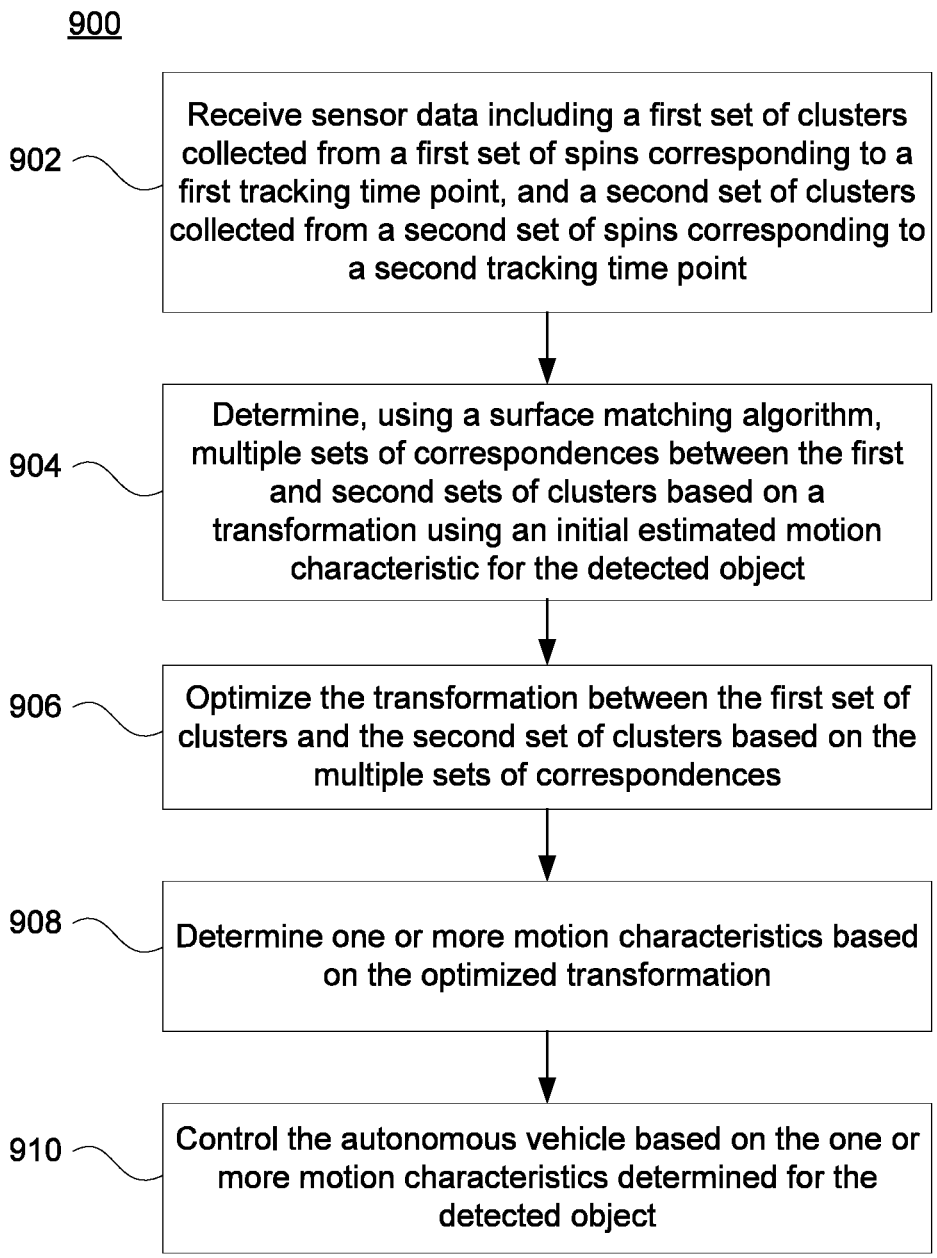

ONBOARD CLUSTER TRACKING SYSTEM

BACKGROUND

Autonomous vehicles, such as vehicles that do not require a human driver, can be used to aid in the transport of passengers, cargo or other items from one location to another. Such vehicles may operate in an autonomous driving mode where passengers may provide some initial input, such as a destination, and the vehicle maneuvers itself to that destination, with minimal or no additional passenger control. Thus, such vehicles may be largely dependent on systems that are capable of determining the location of the autonomous vehicle at any given time, as well as detecting and identifying objects external to the vehicle, such as other vehicles, stop lights or yield signs, pedestrians, bicyclists, etc.

Lidar or other sensor information may be used to detect and track other objects. The sensor information may be collected multiple times per second from one or more sensors. Depending on the relative speed, location, and orientation of other objects to the autonomous vehicle, occlusions and other issues, it may be difficult for the on-board system to determine that a particular object has been detected in subsequent sensor scans, or to determine what kind of object has been detected. These issues may adversely impact driving decisions, route planning and other operations aspects of the autonomous vehicle.

BRIEF SUMMARY

In accordance with aspects of the technology, a method for tracking objects by an autonomous vehicle comprises receiving, by one or more computing devices of the autonomous vehicle, sensor data collected during a plurality of spins by a sensor of the autonomous vehicle including a first spin and a second spin. The sensor data including one or more clusters corresponding to one or more objects detected in an environment around the autonomous vehicle. The method also includes associating, by the one or more computing devices, a given cluster from the first spin to a given cluster from the second spin as corresponding to a given detected object of the one or more detected objects in the environment. The method further includes setting, by the one or more computing devices, a current estimated motion characteristic for the given detected object to an initial estimated value, and adjusting, by the one or more computing devices based on the current estimated motion characteristic, one or more points in the given cluster from the second spin and one or more points in the given cluster from the first spin to obtain adjusted clusters. The method additionally includes determining, by the one or more computing devices using a surface matching algorithm, an adjusted motion characteristic based on the adjusted clusters, and controlling, by the one or more computing devices, the autonomous vehicle based on the adjusted motion characteristic of the given detected object.

In one example, the method further comprises: comparing, by the one or more computing devices, the current estimated motion characteristic with the adjusted motion characteristic; determining, by the one or more computing devices, that the current estimated motion characteristic is within a predetermined tolerance with the adjusted motion characteristic; and determining, by the one or more computing devices based on determining that the current estimated motion characteristic is within the predetermined tolerance, that clusters having one or more points adjusted points and a current estimated velocity are accurate. Here, controlling the vehicle is further based on the determination that the adjusted clusters and the current estimated velocity are accurate.

In another example, the method further comprises comparing the current estimated motion characteristic with the adjusted motion characteristic and determining, that the current estimated motion characteristic is not within a predetermined tolerance with the adjusted motion characteristic. In one scenario, determining that the current estimated motion characteristic is not within the predetermined tolerance with the adjusted motion characteristic indicates that the current estimated motion characteristic has not converged with the adjusted motion characteristic. Here, upon indication that the current estimated motion characteristic has not converged with the adjusted motion characteristic, the method further includes: updating the current estimated motion characteristic; and comparing the updated current estimated motion characteristic with the adjusted motion characteristic. In another scenario, upon determining that the current estimated motion characteristic is not within the predetermined tolerance, the method includes: setting the current estimated motion characteristic to be equal to the adjusted motion characteristic; adjusting, based on the current estimated motion characteristic, one or more points in the given cluster from the second spin and one or more points in the given cluster from the first spin; determining, using the surface matching algorithm, a second adjusted motion characteristic based on the adjusted clusters; and comparing, the current estimated motion characteristic with the second adjusted motion characteristic. Here, controlling the autonomous vehicle is further based on comparing the current estimated motion characteristic with the second adjusted motion characteristic.

In another example, the first spin is a current spin of the sensor and the second spin is a prior spin last in time before the first spin. In a further example, the first and second spins are due to rotation of the sensor about an axis. In yet another example, the adjusting includes moving at least one of the one or more points in the given cluster from the second spin or the one or more points in the given cluster from the first spin to account for a distorted representation of a detected object. The surface matching algorithm may be an Iterative Closest Point algorithm. And the adjusted motion characteristic may be a velocity characteristic.

In accordance with other aspects of the technology, a method for tracking objects by an autonomous vehicle comprises receiving, by one or more computing devices of the autonomous vehicle, sensor data including a first set of clusters collected from a first set of spins corresponding to a first tracking time point, and a second set of clusters collected from a second set of spins corresponding to a second tracking time point. The first set of clusters and the second set of clusters all correspond to a detected object. The method also comprises determining, by the one or more computing devices using a surface matching algorithm, multiple sets of correspondences between the first and second sets of clusters based on a transformation using an initial estimated motion characteristic for the detected object. The method further comprises optimizing, by the one or more computing devices, the transformation between the first set of clusters and the second set of clusters based on the multiple sets of correspondences. The method also includes determining, by the one or more computing devices, one or more motion characteristics based on the optimized transformation, and controlling, by the one or more computing devices, the autonomous vehicle based on the one or more motion characteristics determined for the detected object.

In one example, the method further comprises transforming, by the one or more computing devices, the first set of clusters using the optimized transformation to generate a predicted second set of clusters; comparing, by the one or more computing devices, the predicted second set of clusters with the second set of clusters; and determining, by the one or more computing devices, that distances between points in the predicted second set of clusters to corresponding points in the second set of clusters are within a predetermined threshold. Here, the method may further comprise: determining, by the one or more computing devices using the surface matching algorithm, new multiple sets of correspondences between the first set of clusters and the predicted second set of clusters based on the optimized transformation; re-optimizing, by the one or more computing devices, the optimized transformation between the first set of clusters and the predicted second set of clusters based on the new multiple sets of correspondences; and determining, by the one or more computing devices, one or more new motion characteristics based on the re-optimized transformation. In this case, controlling the vehicle is further based on the one or more new motion characteristics.

In another example, the method further comprises determining, by one or more computing devices, that a spin rate of a sensor obtaining the sensor data is faster than a tracking rate, wherein determining the multiple sets of correspondences is based on the spin rate being faster than the tracking rate. In a further example, the method further comprises: generating, by the one or more computing devices, multiple sets of hypotheses for the surface matching algorithm; determining, by the one or more computing devices, a confidence level for each of the multiple sets of hypotheses; and selecting, by the one or more computing devices based on the confidence levels, a subset of the multiple sets of hypotheses. Here, the surface matching algorithm uses the subset of the multiple sets of hypotheses.

In yet another example, the method further comprises: determining, by the one or more computing devices, that the detected object has a horizontal cross section with asymmetry meeting a set of predetermined rules; and determining, by the one or more computing devices, a yaw rate for the detected object based on the asymmetry meeting the set of predetermined rules. And in another example, the method further comprises: accumulating, by the one or more computing devices, clusters from multiple spins associated as corresponding to the detected object into a merged cluster; and classifying, by the one or more computing devices, the detected object based on the merged cluster. Here, controlling the vehicle is further based on the classification.

In accordance with further aspects of the technology, a system is provided for operating a vehicle in an autonomous driving mode. The system comprises a driving system configured to cause the vehicle to perform driving actions while in the autonomous driving mode, a perception system configured to detect objects in an environment around the vehicle, and a computing system having one or more processors and memory. The computing system is operatively coupled to the driving system and the perception system. The computing system is configured to receive sensor data collected during a plurality of spins by a sensor of the perception system. The plurality of spins includes a first spin and a second spin. The sensor data includes one or more clusters corresponding to one or more objects detected in the environment around the vehicle. The computing system is also configured to associate a given cluster from the first spin to a given cluster from the second spin as corresponding to a given detected object of the one or more detected objects in the environment, to set a current estimated motion characteristic for the given detected object to an initial estimated value, to adjust, based on the current estimated motion characteristic, one or more points in the given cluster from the second spin and one or more points in the given cluster from the first spin to obtain adjusted clusters, and to determine, using a surface matching algorithm, an adjusted motion characteristic based on the adjusted clusters. The computing system is further configured to control the vehicle via actuation of the driving system based on the adjusted motion characteristic of the given detected object. In one scenario the system further comprises the vehicle.

And in accordance with other aspects of the technology, a system for operating a vehicle in an autonomous driving mode is provided. The system comprises a driving system configured to cause the vehicle to perform driving actions while in the autonomous driving mode, a perception system configured to detect objects in an environment around the vehicle, and a computing system having one or more processors and memory. The computing system is operatively coupled to the driving system and the perception system. The computing system is configured to receive, from a sensor of the perception system, sensor data including a first set of clusters collected from a first set of spins corresponding to a first tracking time point, and a second set of clusters collected from a second set of spins corresponding to a second tracking time point. The first set of clusters and the second set of clusters all correspond to a detected object. The computing system is also configured to determine, using a surface matching algorithm, multiple sets of correspondences between the first and second sets of clusters based on a transformation using an initial estimated motion characteristic for the detected object, to optimize the transformation between the first set of clusters and the second set of clusters based on the multiple sets of correspondences, and to determine one or more motion characteristics based on the optimized transformation. The computing system is further configured to control the vehicle via actuation of the driving system based on the one or more motion characteristics determined for the detected object.

BRIEF DESCRIPTION OF THE DRAWINGS

FIGS. 4A-C illustrate an under-segmentation scenario.

FIGS. 5A-C illustrate an over-segmentation scenario.

FIGS. 6A-C illustrate one example of cluster association in accordance with aspects of the technology.

FIGS. 7A-C illustrate an example of motion distortion.

FIG. 9 illustrates another method in accordance with aspects of the disclosure.

DETAILED DESCRIPTION

Figure 1A:
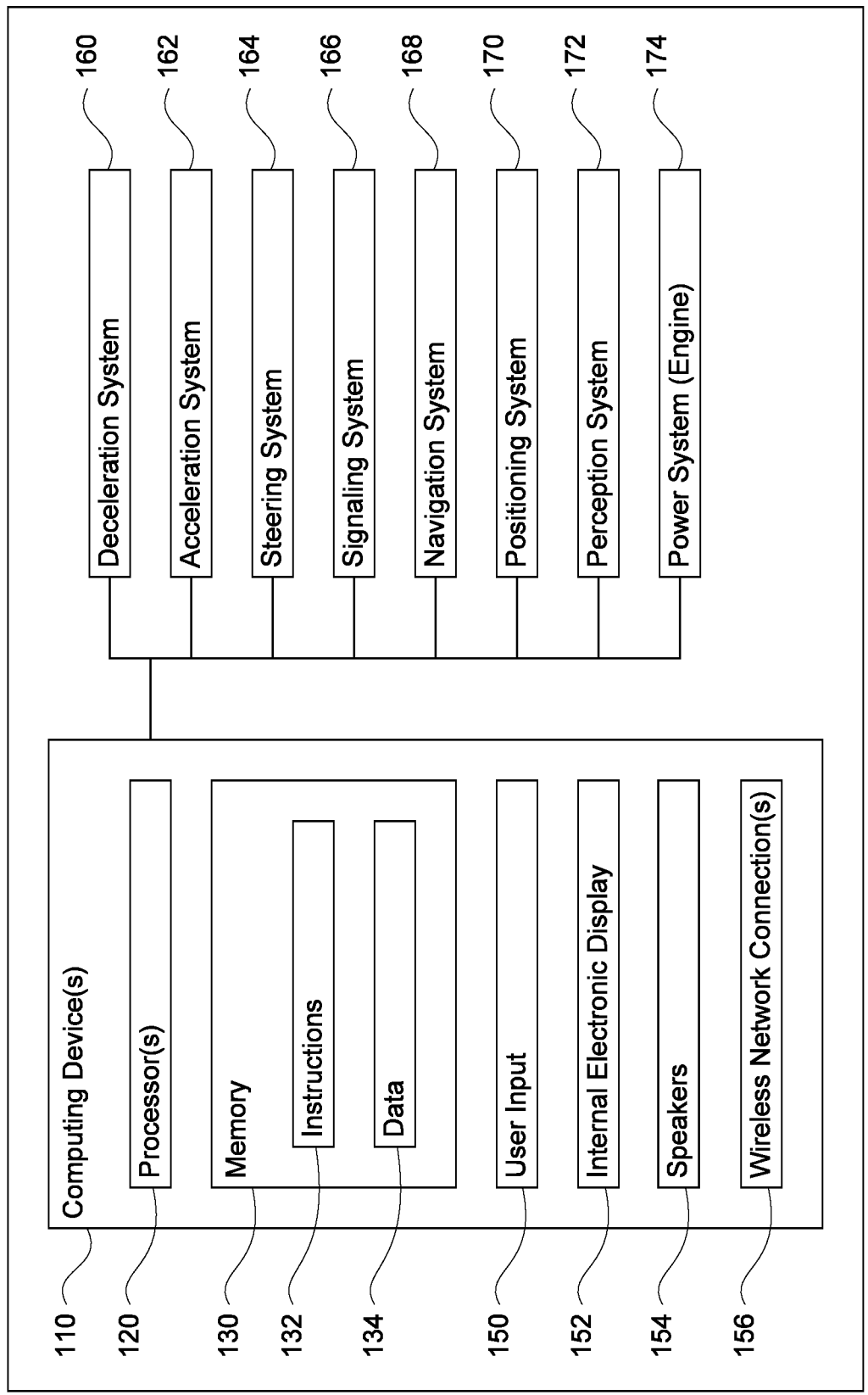
FIG. 1A is a functional diagram of an example vehicle in accordance with aspects of the disclosure according to aspects of the disclosure.

The technology relates generally to tracking objects in an environment around a vehicle configured to operate in an autonomous driving mode. For instance, while driving, a human driver may readily observe a vehicle in another lane, and keep track of that vehicle. This may continue even if the distance and angle between the human driver and that vehicle may change over time and even if at some points only portions of that vehicle may be visible to the human driver. An autonomous vehicle may also need to track objects in its environment in order to predict the objects' behavior and to react safely.

For instance, the vehicle's onboard perception system may use one or more sensors to continuously or periodically collect sensor data on the vehicle's environment, and use the collected sensor data to detect and classify objects in the vehicle's environment. The vehicle's computing devices may also track the detected objects to generate motion characteristics, which may be used to make behavior predictions for the detected objects, for instance based on different behavior models for different object types. Examples of motion characteristics may include position, velocity, acceleration/deceleration, heading, yaw rate, etc. However, inaccuracies and limitations in sensor measurements of moving objects may cause errors in the motion characteristics, such as motion distortion, which may in turn result in errors in behavior prediction. In order to address these issues, a tracking system of the vehicle may be configured to generate motion characteristics for tracked objects which account for inaccuracies and limitations in sensor measurements.

By way of example, a lidar sensor collects a set of sensor data (a point cloud) of its surroundings periodically, e.g., every 0.1 seconds, or more or less. The entire point cloud (a "spin"), may be divided into individual clusters by a processing module called a segmenter. Here, each cluster can correspond to a particular object, e.g., another vehicle, a pedestrian, a cyclist, a traffic cone, etc. A spin may occur due to a complete (e.g., 360°) or partial rotation (e.g., 45°, 90°, 180° or more or less) of the lidar sensor about an axis. A spin may also occur when a fixed position lidar sensor collects the set of sensor data.

Each spin produces a list of clusters. The processing system needs to determine the correspondences between consecutive spins, e.g., where a given cluster goes in the next spin, or whether one cluster comes from another cluster in the previous spin. After the system determines such correspondences, it can build a track for each object and can estimate object motion by comparing the clusters for that object in consecutive spins. From spin to spin, the cluster tracker process performed by the processing system maintains the track for each object. This track information can be shared with other parts of the processing system, for instance a behavior prediction module, an object classification module, a planner module, etc. Tracking processes may take place in a very short time between spins, for instance in less than 0.1 seconds.

The features described herein provide efficient and accurate ways to analyze clusters, including handling over- or under-segmentation of clusters. The resultant information may be used to more accurately determine shapes and types of objects, which can enhance driving operations.

Example Systems

As shown in FIG. 1A, a vehicle 100 in accordance with one aspect of the disclosure includes various components. While certain aspects of the disclosure are particularly useful in connection with specific types of vehicles, the vehicle may be any type of vehicle including, but not limited to, cars, trucks and other cargo vehicles, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any non-transitory type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1A functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices. The wireless network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may comprise an autonomous driving computing system incorporated into vehicle 100. The autonomous driving computing system may capable of communicating with various components of the vehicle in order to maneuver vehicle 100 in a fully autonomous driving mode and/or semi-autonomous driving mode. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

Returning to FIG. 1A, computing devices 110 may be in communication with various systems of vehicle 100, such as deceleration system 160, acceleration system 162, steering system 164 (which collectively may form a driving system of the vehicle), signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more lidar sensors, radar units, sonar devices, microphones, optical cameras, infrared cameras and/or any other detection devices that record data which may be processed by computing devices 110. The sensors of the perception system may detect objects and their characteristics such as location, orientation, size, shape, type, direction and speed of movement, etc. The raw data from the sensors (e.g., lidar point clouds, radar returns, imagery, etc.) and/or the aforementioned characteristics can be quantified or arranged into a descriptive function or vector and sent for further processing to the computing devices 110. As an example, computing devices 110 may use the positioning system 170 to determine the vehicle's location and perception system 172 to detect and respond to objects when needed to reach the location safely.

Figure 1B:
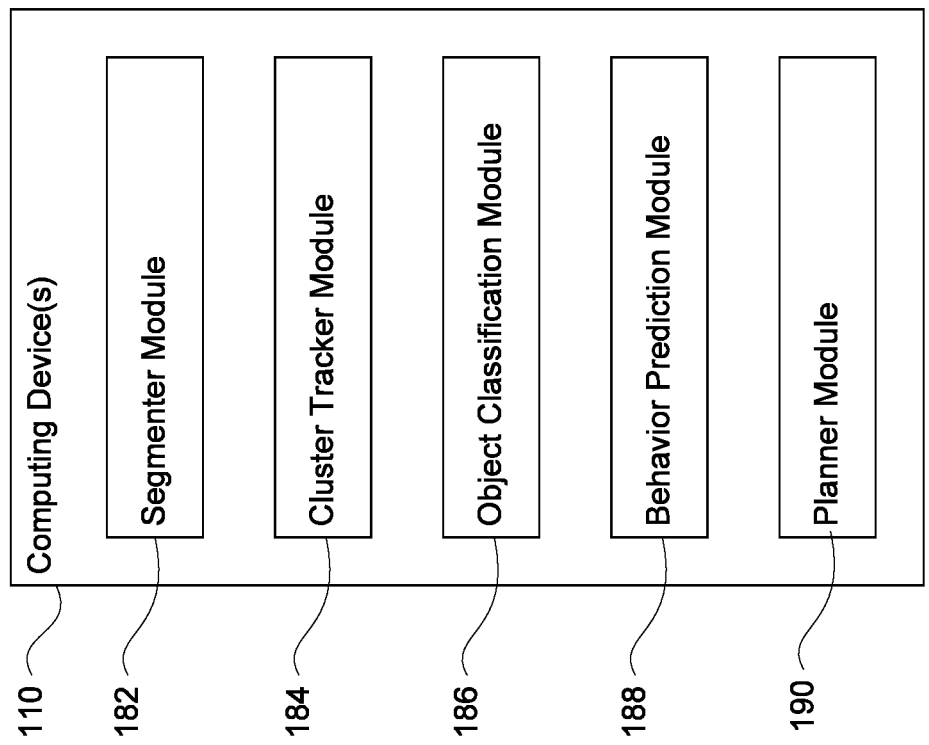
FIG. 1B is a functional diagram of processing modules in accordance with aspects of the disclosure.

FIG. 1B is a functional diagram 180 illustrating various operational modules that may be implemented by the processor(s) of computing device(s) 110 in accordance with the instructions 132 and data 134 of memory 130. For instance, a segmenter module 182 may divide each spin into individual clusters. A cluster tracker module 184 may maintain the tracks for objects detected in the surrounding environment based on the clusters from the segmenter module 182. An object classification module 186 may use the tack information from the cluster tracker module 184 to identify the types or classes of objects detected by the perception system 172. Behavior prediction module 188 may use behavior models stored in memory to identify likely actions by the classified objects. For instance, an object detected to be a bicyclist may be predicted to ride in a bike lane along the side of the roadway as opposed to riding in a driving lane or along the shoulder. And planner module 190 may use object classifications, behavior predictions, map data, weather data, traffic data and/or other information to plan a short term (e.g., next 5-10 seconds) or long term (e.g., the rest of the trip) route for the vehicle.

Figure 2:
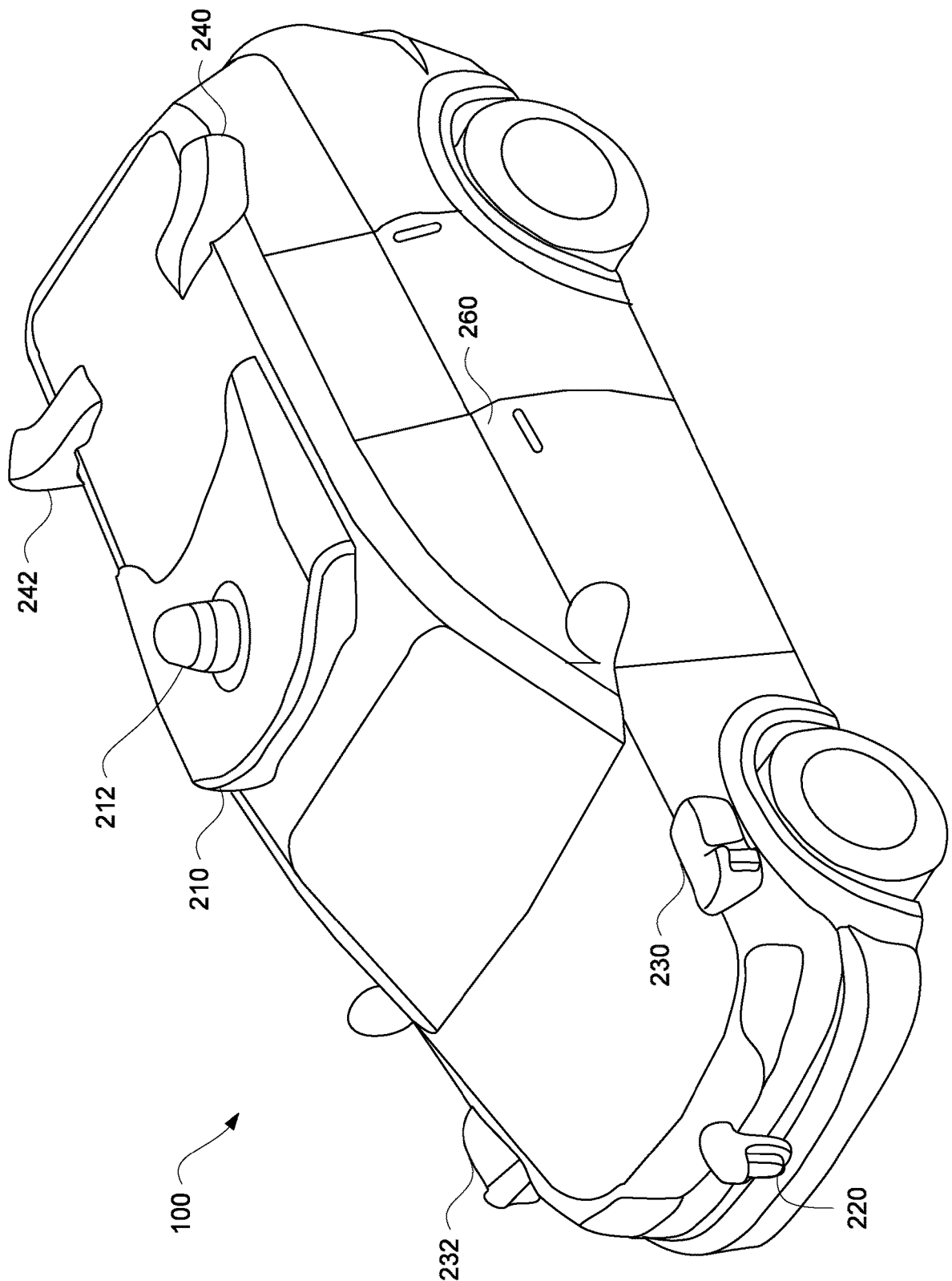
FIG. 2 is an example external view of the example vehicle of FIG. 1 in accordance with aspects of the disclosure.

FIG. 2 is an example external view of vehicle 100 including aspects of the perception system 172. For instance, roof-top housing 210 and dome housing 212 may include a lidar sensor or system as well as various cameras and radar units. In addition, housing 220 located at the front end of vehicle 100 and housings 230, 232 on the driver's and passenger's sides of the vehicle may each store a lidar sensor and other devices. For example, housing 230 is located in front of driver door 260. As shown, vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210. The particular sensor types and their placements are merely exemplary, and may vary depending on the type of vehicle and other factors.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

The vehicle's processing system may receive sensor data collected during a current spin by a sensor of the perception system. As mentioned above, the perception system may have one or more sensors, including sensors that may periodically scan the vehicle's environment in order to track objects. For instance, the perception system may include one or more lidar sensors that may perform a "spin" at a predetermined spin rate. Depending on the type of sensor the spin may be a complete 360° scan around the vehicle, or a partial scan of one region (e.g., along a front or rear section) around the vehicle such as between 45°-180°, or more or less.

Figure 3A:
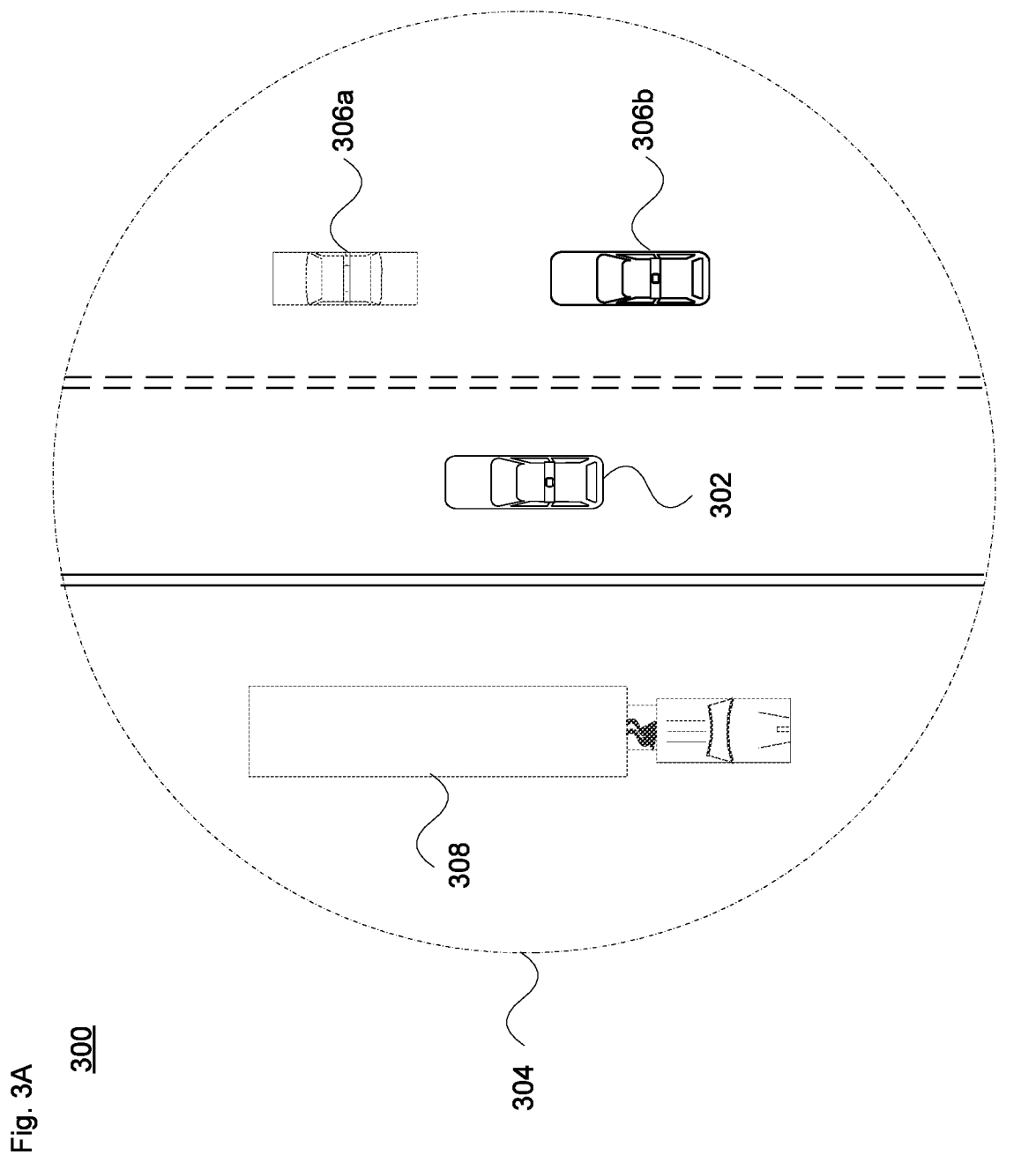
FIGS. 3A-B illustrate a sensor scan example in accordance with aspects of the disclosure.
Figure 3B:
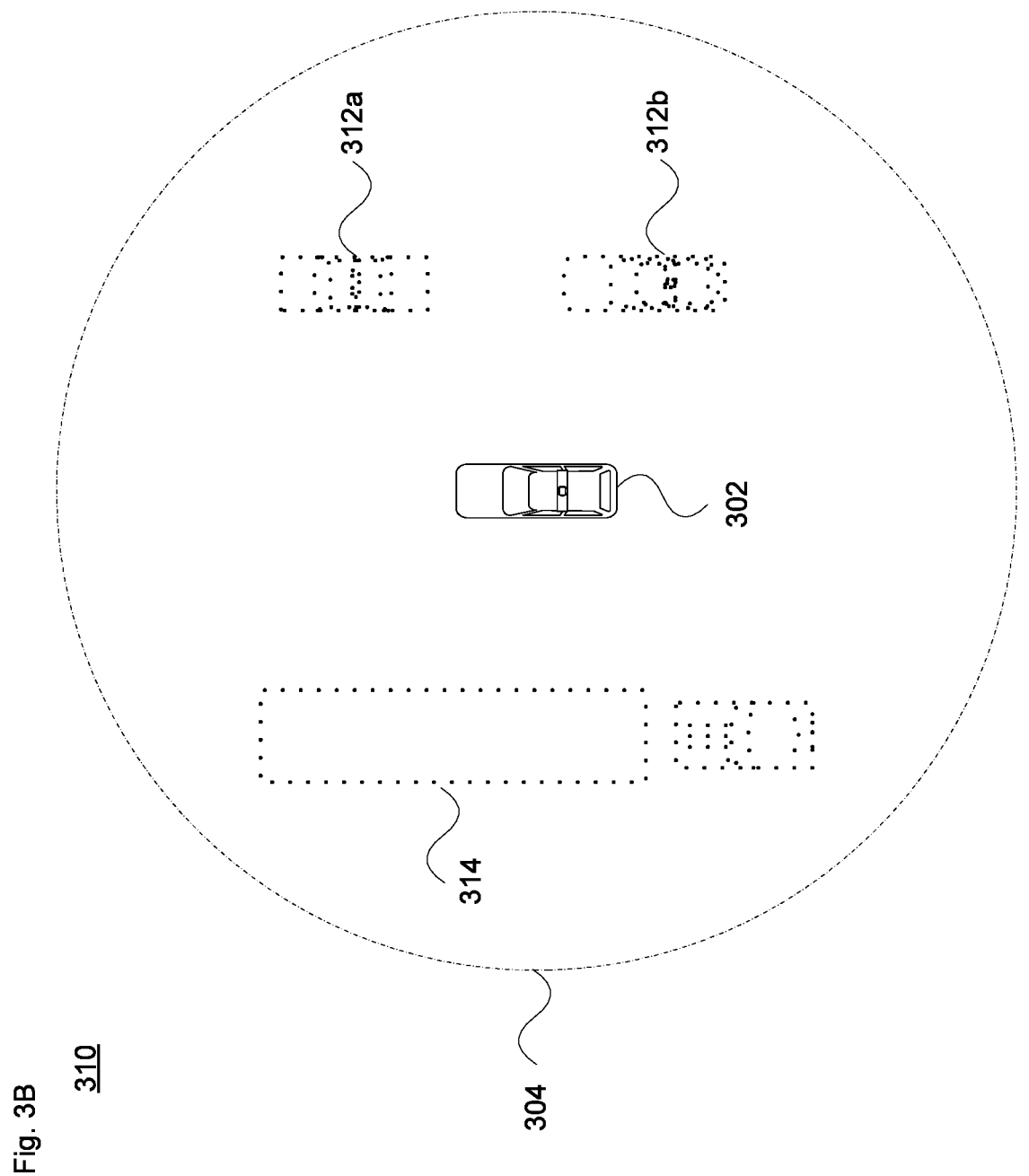

FIG. 3A illustrates a scenario 300 in which a lidar sensor of a vehicle 302 generates a complete scan within a radius encompassed by dash-dot circle 304 around the vehicle 302. As shown in FIG. 3A, the vehicle 302 may be traveling along a roadway, and other objects within the scan radius may include passenger vehicles 306 traveling in the same direction and a truck 308 traveling in the opposite direction. FIG. 3B illustrates a scan 310 made by the lidar, with point clouds 312a and 312b obtained via returns from the vehicles 306a and 306b, and point cloud 314 obtained via returns from the vehicle 308. As an example, this information may be automatically sent by the perception system to the computing devices of the processing system each time a sensor scan is captured.

The processing system may be configured to segment the sensor data (e.g., point cloud data) from the spin so that points having one or more same or similar properties may be identified as being in a cluster. As such, the segmented sensor data may include one or more clusters corresponding to one or more objects detected in the vehicle's environment. Each cluster in a spin may represent a snapshot of an object at or around a timestamp of the spin. In some instances, the sensor data may be under-segmented (e.g., points corresponding to two different objects are not distinguished) or over-segmented (e.g., portions of one object are identified as two clusters). As discussed further below, by tracking and evaluating clusters instead of individual points in the sensor data, under- and over-segmentation can be addressed by the system.

FIGS. 4A-B illustrate one example of under-segmentation. In particular, illustration 400 FIG. 4A illustrates two different vehicles 402 and 404. Depending on their distances, orientations and speeds relative to another vehicle (e.g., vehicle 302 of FIG. 3A), the returned point cloud data may be as shown in illustration 410 of FIG. 4B, with point cloud data 412 corresponding to vehicle 402 and point cloud data 414 corresponding to vehicle 404. In this case, as shown in illustration 420 of FIG. 4C, the point cloud sensor data may be under-segmented as shown by bracketed result 422.

FIGS. 5A-B illustrate one example of over-segmentation. In particular, illustration 500 FIG. 5A illustrates a large vehicle 502, such as a tractor-trailer truck. Depending on the distance, orientation and speed of vehicle 502 relative to another vehicle (e.g., vehicle 302 of FIG. 3A), the returned point cloud data may be as shown in illustration 510 of FIG. 5B, with point cloud data 512 corresponding to both the tractor (cab) and trailer of the vehicle 502. In this case, as shown in illustration 520 of FIG. 5C, the point cloud sensor data may be over-segmented as shown by bracketed results 522 (corresponding to the trailer) and 524 (corresponding to the tractor).

The processing system (e.g., cluster tracker module 184 of FIG. 1B) may associate a given cluster from the current spin with a given cluster from a prior spin stored in memory as corresponding to a given detected object. The prior spin may be the spin last in time before the current spin. For instance, cluster associations between spins may be performed by making future projections for a detected object. In one example, the tracking system may apply a Kalman filter on a cluster in the prior spin to estimate a current velocity of the object corresponding to the cluster.

Using the estimated current velocity, the cluster tracker may generate a projected cluster for the object at the timestamp of the current spin. The tracking system may then compare the projected cluster with actual clusters from the current spin. In some instances, the cluster from the current spin with the greatest overlap with the projected cluster may be associated as corresponding to the object. For another example, where there is no overlapping cluster from the current spin, the cluster from the current spin that is closest to the projected cluster may be associated as corresponding to the object.

Additionally or alternatively, the cluster tracker may associate clusters from different spins using a surface matching algorithm, such as an Iterative Closest Point ("ICP") algorithm. By way of example, an ICP algorithm may be run on every pair of consecutive point clouds of the same object. This may include, for example, vehicles, pedestrians, cyclists or other objects. The ICP algorithm may provide each object's movement, in particular translation and rotation, from consecutive observations of the object. The translation divided by the time difference between the point clouds may provide a velocity for a given object, and the rotation divided by the time gap can provide yaw rate, pitch rate and roll rate for that object.

Figure 6B:
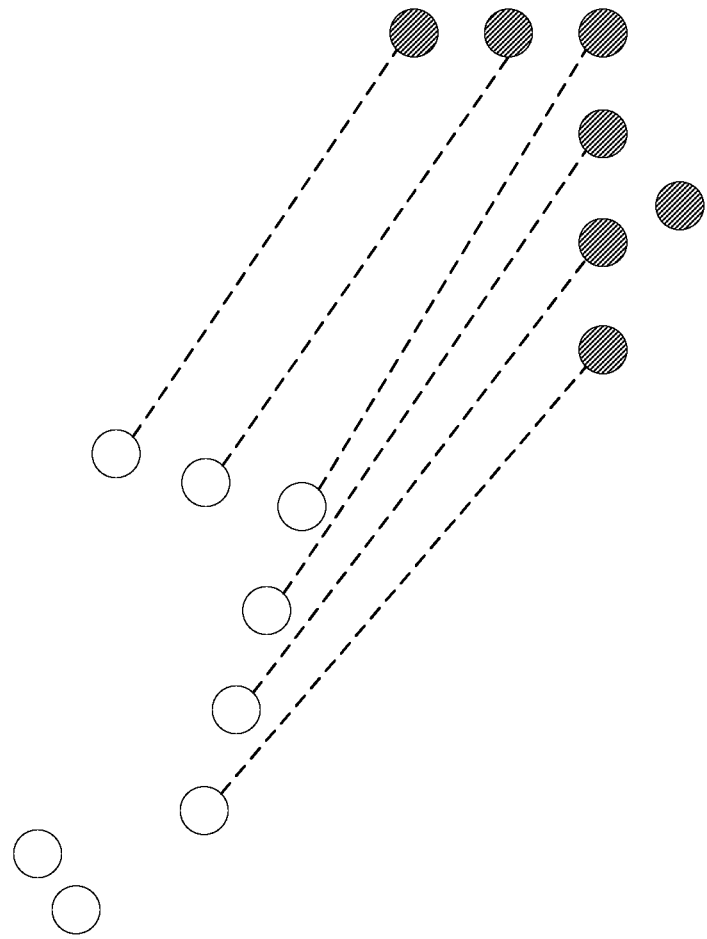
Figure 6C:
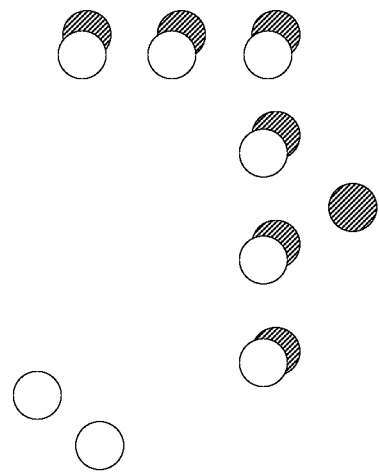

FIGS. 6A-C illustrate one example of cluster association using an ICP approach. As shown in illustration 600, there is first cluster 602 from a first point in time (e.g., time t0) and a second cluster 604 from a second, later point in time (e.g., time $t_1$). The times associated with the clusters will depend on the capture or spin rate for the given sensor, which may be, e.g., between 1-50 Hz, or more or less. These clusters may correspond to data from consecutive scans (e.g., spins) from the same sensor, such as a lidar sensor. The ICP process first generates correspondences between individual points in the first and second clusters, as indicated by dashed lines in illustration 610 of FIG. 6B. And as shown in illustration 620 of FIG. 6C, a transform (e.g., translation and rotation) may be performed on the two clusters. The transformation may be divided by the time difference ($t_0$-$t_1$) to determine the object's rate of speed and its heading.

In this regard, correspondences may be found between points in a given cluster from the current spin with points in clusters from the prior spin. For instance, the given cluster from the current spin may be associated with a cluster from the prior spin with the greatest number of point correspondences. As such, each cluster in a current spin may be associated with at most one "track" for a previously detected object or starts a new track for a newly detected object. The cluster tracker may be configured such that many clusters may be associated with one track and subsequently be split into multiple tracks. In other words, the tracking system may not initially distinguish two objects, but eventually will distinguish the two objects if and when their tracks diverge. The tracking system may also be configured such that a cluster cannot be associated with more than one track.

A lifespan may be set for a track such that, if no cluster from a current spin is associated with the track, the track may still be stored for the lifespan, instead of being deleted immediately. For instance, the tracking system may be configured to generate a confidence score when a new track is identified. In this regard, a longer lifespan may be set for a track with a higher confidence score than a track with a lower confidence score. For example, if the confidence score for a track meets a high confidence threshold, and if no cluster from the current spin is associated with the track, the track may be given a lifespan until the next spin. For another example, if the confidence score for a track is at or below a low confidence threshold (e.g., an 85% confidence threshold, or more or less), the track may be destroyed immediately if no cluster from the current spin is associated with the track.

The tracking system may determine, based on a spin rate of the sensor, to adjust for motion distortion when generating one or more motion characteristics. According to one aspect of the technology, motion distortion may be corrected based on two factors, (i) the prior estimated velocity of that object, and (ii) the time difference within the cluster (comparing the earliest scan point and the latest scan point of that cluster). This can be evaluated by determining whether the velocity multiplied by the time difference is larger than some preset distance, e.g., 3-5 meters, or more or less.

By way of example, at low spin rates (e.g., 1-5 Hz, or more or less), points in a cluster corresponding to a fast moving object may appear to be moving at different rates with respect to one another. For instance, a first edge of the object may be captured by a lidar sensor at a first time point during the spin, while a second edge of the object may be captured by the lidar sensor at a second time point during the same spin. However, because the object is moving much faster than the spin rate of the lidar sensor, the second edge of the object (captured at the second time point) may appear to have moved farther than the first edge of the object (captured at the first time point).

Figure 7A:
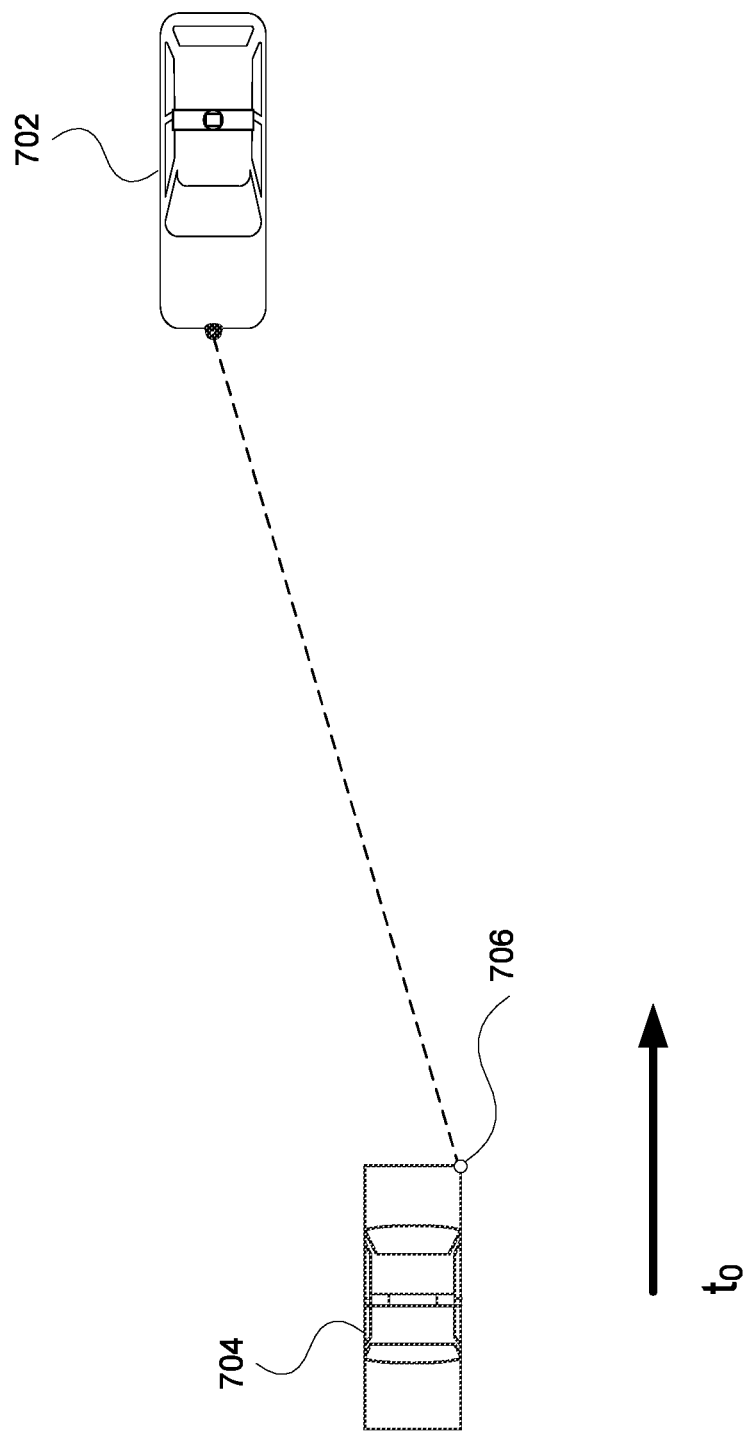
Figure 7B:
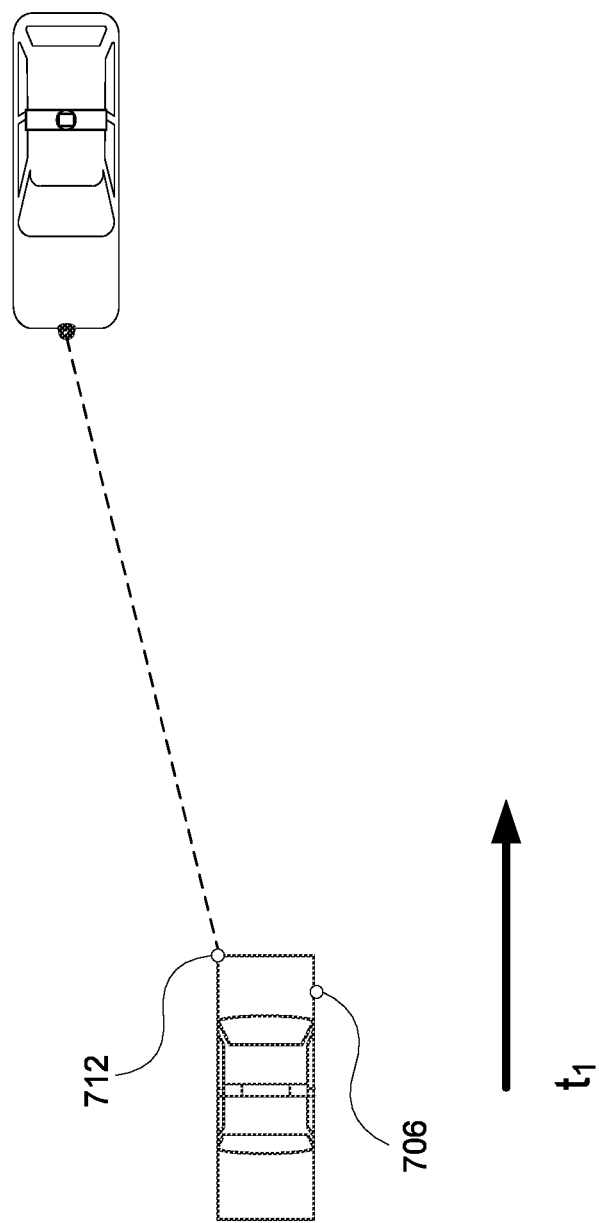

FIGS. 7A-C is a scenario illustrating one example of motion distortion. As shown in illustration 700 of FIG. 7A, vehicle 702 receives a return from another vehicle 704, in particular from a right front corner 706 of the vehicle 704, as shown by the dashed line. This return was captured at time t0, with the vehicle 702 moving toward the vehicle 702, as indicated by the arrow. Illustration 710 of FIG. 7B illustrates the scenario where the vehicle 704 has moved toward the vehicle 702. Here, at time $t_1$, the vehicle 702 obtains a second return from the vehicle 704, in particular from a left front corner 712 of the other vehicle, as shown by the dashed line. Here, for illustration purposes only, the location 706 is shown at time $t_1$ as having moved rearward along the side of the other vehicle. Here, the average based on the different points captured at slightly different points in time could result in a distorted representation of the other vehicle, as shown by illustration 730 of FIG. 7C.

In some instances, the perception system may include a first lidar sensor with a low spin rate, such as 2-5 Hz, a second lidar sensor at a higher spin rate, such as 15-25 Hz, and a third lidar sensor at an intermediate spin rate, such as 5-15 Hz. In such instances, the cluster tracker may be configured to adjust for motion distortion only when generating motion characteristics based on sensor data from the lowest spin rate sensor (here, the first lidar), although another sensor can be used as a baseline for motion compensation.

The cluster tracker may first set a current estimated motion characteristic to an initial estimated value. For instance, the current estimated motion characteristic may be a current estimated velocity for an object, which may be set to a velocity determined for the object for a previous spin. In one scenario, for a cluster from an initial spin when the sensors are first turned on, the current estimated velocity may be set to zero since there is no prior data to rely upon. Here, the current velocity estimate may be assigned a large uncertainty value. By way of example, the current estimated velocity may be set at 100 km/hr with an uncertainty value of 0.9 or more on a scale of 0.0 to 1.0).

The system may adjust (e.g., translate or otherwise move) one or more points in the given cluster from the prior spin and one or more points in the given cluster from the current spin based on the current estimated motion characteristic. For instance, if the spin rate is 4 Hz, each spin of a 360° scan may take 0.25 seconds to complete. The detected object may be determined to have points occupying 10 degrees of the spin that would have taken about 0.007 seconds for the lidar sensor to scan. As such, a first edge of the object may be scanned at a first time point 0.007 seconds earlier than a second time point for the second edge of the object. Since according to the above example the current estimated velocity is 100 km/hr, the second edge may be 100 km/hr*0.007 s=0.194 m farther than the first edge. Therefore, points in the clusters may be adjusted (translated or moved) to an average time point between the first time point and the second time point. By way of example, the first edge may be adjusted forwards 0.097 m, the second edge may be adjusted backwards 0.097 m, and points between these two edges may be adjusted by some value between 0.097 m forwards and 0.097 m backwards.

The cluster tracker may use a surface matching algorithm to determine an adjusted motion characteristic based on the adjusted clusters. For instance, the tracking system may use ICP to determine a transformation that can be applied to align the two adjusted clusters. The tracking system may then use the transformation and a difference in timestamps between the two adjusted clusters to determine an adjusted motion characteristic. For example, if a transformation of 10 meter is found to align two adjusted clusters, and timestamps for the two adjusted clusters are 0.25 s apart, an adjusted velocity of the object may be determined to be 40 m/s or 144 km/hr.

The system may compare the current estimated motion characteristic with the adjusted motion characteristic to determine whether it is within a predetermined tolerance of the adjusted motion characteristic. For instance, if the current estimated motion characteristic converges with the adjusted motion characteristic, the cluster tracker may conclude that the adjusted clusters as well as the current estimated motion characteristic are accurate. In this regard, convergence may be determined based on a predetermined tolerance. For example, if the current estimated velocity (the initial estimated value) and the adjusted estimated velocity (based on the adjusted clusters) are within the predetermined tolerance (e.g., within a 5-10% tolerance amount), the cluster tracker may conclude that the adjusted clusters and the current estimated velocity are accurate.

In contrast, if the current estimated motion characteristic does not converge with the adjusted motion characteristic, the system may set the current estimated motion characteristic to the adjusted motion characteristic. For example, if the current estimated velocity (the initial estimated value) and the adjusted estimated velocity (based on the adjusted clusters) are not within the predetermined tolerance (e.g., within a 5-10% tolerance amount), the tracking system may determine that the adjusted clusters and/or the current estimated velocity may not be accurate. As such, the cluster tracker may set the current estimated velocity to the adjusted estimated velocity.

If the current estimated motion characteristic is updated, the system may repeat the process with the new current estimated motion characteristic until convergence is reached. For instance, the tracking system may adjust the two clusters based on the updated current estimated motion characteristic, for instance based on a more accurate velocity value. The tracking system may apply ICP on the two newly adjusted clusters to generate another adjusted motion characteristic, and compare that to the current estimated motion characteristic, and so on.

Once determined, the motion characteristics for the detected object may be used as input to other modules used by one or more computing devices of the vehicle. For instance, object classification module 186 of FIG. 1B may classify the detected object based on the motion characteristics in accordance with one or more stored object models. Thus, the object classification module may classify the detected object as a vehicle and not a pedestrian based on a velocity of the detected object being 100 km/hr. And behavior prediction module 188 of FIG. 1B may predict one or more behaviors of the detected object based on the motion characteristics. For example, the behavior prediction module may predict that the detected object will stop based on a deceleration of the detected object.

In another aspect, the system may be further configured to adjust inaccuracies in motion characteristics caused by high spin rates for the sensors. For instance, at a high spin rate, clusters in each spin may have too few points to generate accurate motion characteristics, especially when the sensor has a narrow field of view (FOV), e.g., of between 15°-60°. In this regard, the cluster tracker may be configured to combine sensor data from multiple spins from one sensor to improve accuracy when generating motion characteristics.

For instance, the system may determine that a spin rate of a given sensor of the perception system of the vehicle is faster than a tracking rate of the cluster tracker. The system may be configured to track objects at a predetermined tracking rate, which may be set to be equal to a spin rate of one of the sensors in the perception system. By way of example only, the perception system may include the first lidar sensor with the first spin rate of 4 Hz, the second lidar sensor with the second spin rate of 20 Hz, and the third lidar sensor with the third spin rate of 10 Hz. The tracking rate may be set as the spin rate of the third lidar sensor at 10 Hz so that behavior predictions may be made at the tracking rate, or 10 times per second. As such, the cluster tracker may simply drop sensor data from every other spin of the second lidar sensor. However, as mentioned above, since clusters collected by a sensor with a high spin rate already have fewer points, dropping sensor data may result in too little data for accurate alignment. Thus, instead of dropping the sensor data from a sensor with a high spin rate (e.g. 20 Hz), the cluster tracker may be configured to use the additional sensor data to generate more accurate motion characteristics.

In one scenario, the cluster tracker may receive sensor data including a first set of clusters collected from a first set of spins corresponding to a first tracking time point and a second set of clusters collected from a second set of spins corresponding to a second tracking time point. The first set of clusters and the second set of clusters all correspond to a detected object. Continuing from the example above and referring to the third lidar sensor, since the tracking rate is 10 Hz, the first tracking time point may be $t_A=0.1$ s and the second tracking time point may be $t_B=0.2$ s. Further, since the spin rate of the second lidar sensor is 20 Hz, the first set of spins may include a first spin at $t_1=0.05$ s and a second spin at $t_2=0.1$ s, and the second set of spins may include a first spin at $t_{1'}=0.15$ s and a second spin at $t_{2'}=0.2$ s. Therefore, in this example, a first set of clusters $c(t_1)$ and $c(t_2)$ may be collected for a given object corresponding to tracking time point $t_A$, and a second set of clusters $c(t_{1'})$ and $c(t_{2'})$ may be collected for the given object corresponding to tracking time point $t_B$. In other examples where the spin rate is three or more times of the tracking rate, three or more clusters may be collected for a given object corresponding to each tracking time point.

The cluster tracker may set an initial estimated motion characteristic for the detected object. For instance, an initial estimated motion characteristic may be a current estimated velocity for the detected object, which may be set to a velocity determined for the detected object for a previous spin. For example, the current estimated velocity may be set at 100 km/hr.

Based on the initial estimated motion characteristic, the system may use a surface matching algorithm (e.g., ICP) to determine multiple sets of correspondences between the two sets of clusters based on the initial estimated motion characteristic. Continuing from the example above, a first set of correspondences may be determined between a first cluster $c(t_1)$ from the first set of clusters and a first cluster $c(t_{1'})$ from the second set of clusters, and a second set of correspondences may be determined between a second cluster $c(t_2)$ from the first set of clusters and a second cluster $c(t_{2'})$ from the second set of clusters. For instance, for an ICP algorithm, points in the first cluster $c(t_1)$ from the first set of clusters may be transformed based on the initial estimated motion characteristic, and each of the transformed points is matched with a point in the first cluster $c(t_{1'})$ from the second set of clusters that is the closest. In other examples where the spin rate is three or more times the tracking rate, three or more sets of correspondences may be determined for a given object.

The tracking system may optimize the transformation between the first set of clusters and the second set of clusters based on both the first set of correspondences and the second set of correspondences. For instance, the first cluster $c(t_1)$ from the first set of clusters may be aligned to the first cluster $c(t_{1'})$ from the second set of clusters using the transformation, and a first loss may be computed. Similarly, the second cluster $c(t_2)$ from the first set of clusters may be aligned to the second cluster $c(t_{2'})$ from the second set of clusters, and a second loss may be computed. An overall loss may be computed by summing the first loss and the second loss. The cluster tracker may be configured to optimize the transformation in order to minimize the overall loss. In other words, the transformation is optimized such that the overall distance between transformed points from clusters in the first set of clusters to corresponding points from corresponding clusters in the second set of clusters is minimized.

For one sensor having a first spin rate (e.g., 1-10 Hz), one approach is as follows. Given a set of correspondences $\{(a_i, b_i)\}$, where $a_i$ comes from cluster A and $b_i$ comes from cluster B, the system computes a transformation T so that the overall distance between each $T(a_i)$ and $b_i$ is minimized. This minimization process can be performed using, e.g., a least squares method.

For another sensor having a higher spin rate (e.g., 11-30 Hz), two sets of correspondences $\{(a_i, b_i)\}$ and $\{(a'_i, b'_i)\}$ may be employed. Here, the system also computes a transformation T that minimizes the overall distance between each $T(a_i)$ and $b_i$, and $T(a'_i)$ and $b'_i$.

The tracking system may transform the first set of clusters using the optimized transformation to generate a predicted second set of clusters. Continuing from the example above, the first set of clusters $c(t_1)$ and $c(t_2)$ may be transformed using the optimized transformation to generate a predicted second set of clusters $c_p(t_{1'})$ and $c_p(t_{2'})$. The tracking system may compare the predicted second set of clusters with the actual second set of clusters. Continuing from the example above, predicted cluster $c_p(t_{1'})$ may be compared to actual cluster $c(t_{1'})$ and predicted cluster $c_p(t_{2'})$ may be compared to actual cluster $c(t_{2'})$.

For instance, if the predicted second set of clusters converges with the actual second set of clusters, the cluster tracker can conclude that the optimized transformation is accurate. In this regard, convergence may be determined based on a predetermined threshold. For example, if distances between points in the predicted second set of clusters and the actual second set of clusters meets the predetermined threshold (e.g., within 5-10%), the tracking system may conclude that the optimized transformation is accurate.

In contrast, if the predicted second set of clusters does not converge with the actual second set of clusters (e.g., within 2-4 iterations), the system may conclude that the optimized transformation is inaccurate. For example, if distances between points in the predicted second set of clusters and the actual second set of clusters do not meet the predetermined threshold, the tracking system may conclude that the optimized transformation is inaccurate. As such, the tracking system may re-calculate a first set of correspondences for the first cluster $c(t_1)$ from the first set of clusters based on the optimized transformation, and re-calculate a second set of correspondences for the second cluster $c(t_2)$ from the second set of clusters based on the optimized transformation, and repeat the process using the new two sets of correspondences.

In another aspect, the tracking system may be configured to generate confidence levels for initial values used in the surface matching algorithm in order to increase efficiency of the surface matching algorithm. For instance, to perform ICP on a pair of clusters, a set of hypotheses may be generated. Here, each set of velocity hypotheses may include a velocity estimated based on a centroid offset (how much the centroid of a cluster has moved), a bounding box center offset (how much the bounding box has moved), a zero (how much movement there is from a reference point), a previous ICP offset (use a previous estimated velocity). As yet another example, a velocity may additionally be estimated based on one or more feature points of two clusters. For instance, where feature points for parts of a detected vehicle such as tires or headlights are identified (for example by a computer vision process), a velocity may be estimated based on the offset between these feature points corresponding to the two clusters.

The tracking system may assign a confidence level for each set of hypotheses based on one or more predetermined rules. For example, a first confidence level may be assigned based on a number of correspondences or number of points successfully matched between two clusters. In another example, a second confidence level may be assigned based on a loss value from the loss function for the transformation. In yet another example, a third confidence level may be based on a covariance estimation. In some instances, an overall confidence level may be assigned based on one or more of aforementioned factors, and/or additional factors. In this regard, the tracking system may be configured to only try a subset of the hypotheses. For example, the subset of hypotheses may be ones having confidence level meeting a confidence threshold (e.g., a 90% threshold, or more or less).

In yet another aspect, the system may determine whether to generate a yaw rate for a detected object. For instance, an object with a circular horizontal cross section such as a traffic cone, a ball, etc., may not be turning, but due to less than perfect correspondence of points between clusters collected during different spins, a surface matching algorithm may nonetheless determine that such an object is turning between the different spins. Furthermore, a yaw rate generated by the surface matching algorithm would be based on the imperfect correspondence of points, rather than actual turning of the object. In this regard, the cluster tracker may be configured to determine that a detected object has a horizontal cross section with asymmetry meeting a set of predetermined rules. The tracking system may be configured to determine a yaw rate for the detected object based on the asymmetry meeting the set of predetermined rules. Examples of the predetermined rules may be that the cross section is not a circle, an oval, or a polygon with more than 5 equal edges.

In still another aspect, the tracking system may be configured to accumulate associated clusters corresponding to a detected object to improve object classification. For instance, the front of an object may be observed behind the vehicle in a first cluster from a first spin. Then, as the object changes lanes, a right side of the object may be observed from left side of the vehicle in a second cluster from a second spin. Next, as the object speeds past the vehicle, a rear side of the object may be observed in front of the vehicle in a third cluster from a third spin. In some instances, an object classification model may not be able to classify the object based on only one of the three clusters showing the front, the side, or the rear of the object, but may be able to classify the object based on all three clusters showing different sides of the object. In this regard, the cluster tracker may be configured to accumulate the first, second, and third clusters into a merged cluster. For instance, the tracking system may use a surface matching algorithm, such as ICP, to compute a transformation that aligns the first, second, and third clusters. The transformed clusters together form the merged cluster that can be used for object classification. The merged cluster may then be used as an input for the object classification module.

The features described above may allow the computing system of an autonomous vehicle to determine accurate motion characteristics of objects detected in its environment despite various limitations in sensor measurements. By correcting motion distortion for fast moving objects, motion characteristics may be determined for such objects with greater accuracy. By finding multiple sets of correspondences for clusters from multiple sensor spins at high spin rates, better alignment may be achieved using a surface matching algorithm even if each cluster may have fewer points. Efficiency of the surface matching algorithm may be further improved by selecting hypotheses based on confidence levels. The features further provide for identifying the types of objects for which a yaw rate can be accurately determined. Object classification may be improved by accumulating associated clusters corresponding to a detected object. In addition, under- or over-segmentation can be avoided with these enhanced approaches.

Figure 8:
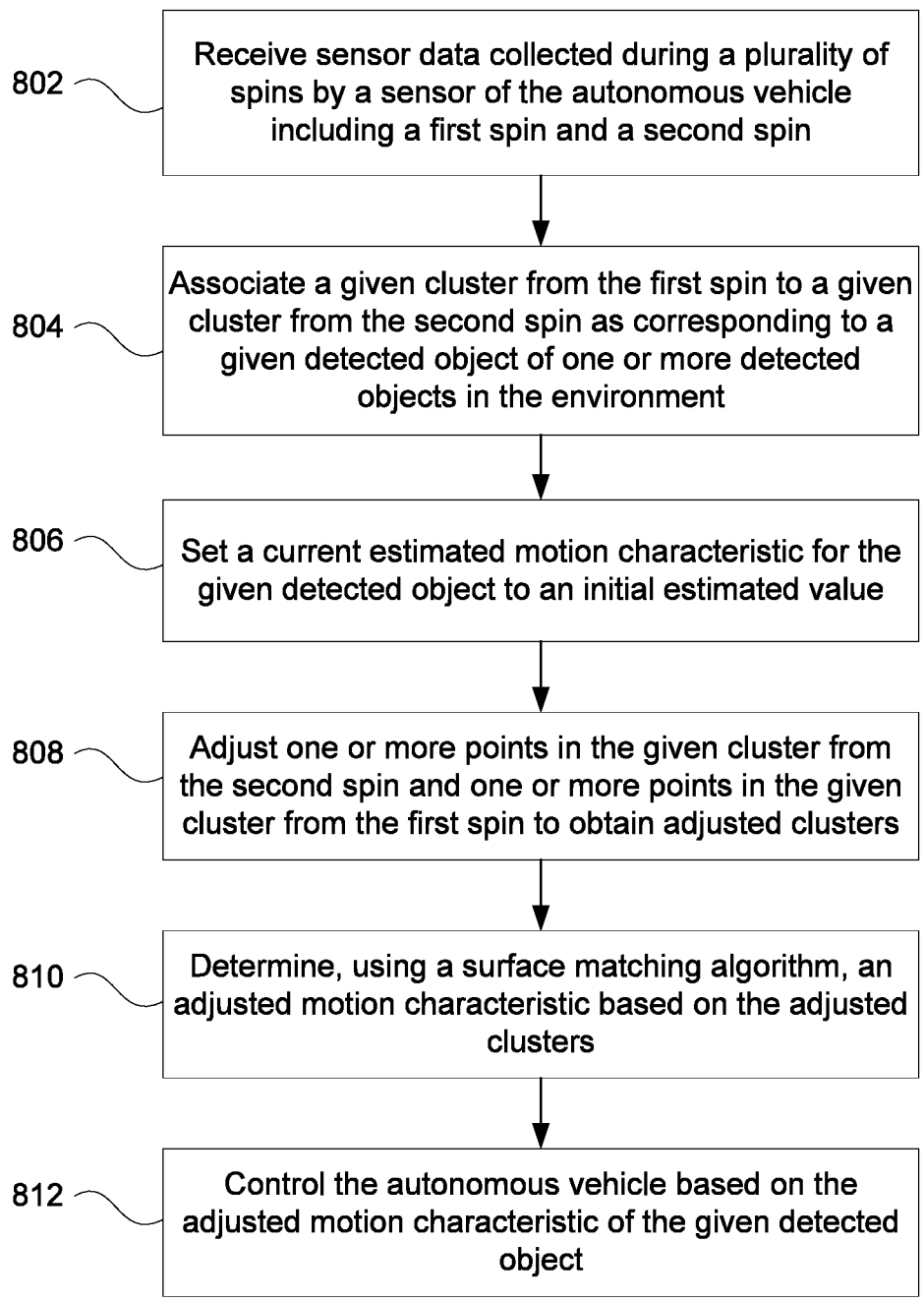
FIG. 8 illustrates a method in accordance with aspects of the disclosure.

FIG. 8 illustrates a method 800 for tracking objects by an autonomous vehicle. At block 802, one or more computing devices of the autonomous vehicle's onboard system receive sensor data collected during a plurality of spins by a sensor of the autonomous vehicle. The plurality of spins includes a first spin and a second spin. The sensor data includes one or more clusters corresponding to one or more objects detected in an environment around the autonomous vehicle. At block 804 a given cluster from the first spin is associated to a given cluster from the second spin as corresponding to a given detected object of the one or more detected objects in the environment. At block 806, a current estimated motion characteristic for the given detected object is set to an initial estimated value. At block 808, the system adjusts, based on the current estimated motion characteristic, one or more points in the given cluster from the second spin and one or more points in the given cluster from the first spin to obtain adjusted clusters. At block 810, a surface matching algorithm is used to determine an adjusted motion characteristic based on the adjusted clusters. And at block 812, the system control the autonomous vehicle based on the adjusted motion characteristic of the given detected object.

FIG. 9 illustrates another method 900 for tracking objects by an autonomous vehicle. At block 902, one or more computing devices of the autonomous vehicle's onboard system receive sensor data including a first set of clusters collected from a first set of spins corresponding to a first tracking time point, and a second set of clusters collected from a second set of spins corresponding to a second tracking time point. The first set of clusters and the second set of clusters all correspond to a detected object. At block 904, the system determines, using a surface matching algorithm, multiple sets of correspondences between the first and second sets of clusters based on a transformation using an initial estimated motion characteristic for the detected object. At block 906, the transformation is optimized between the first set of clusters and the second set of clusters based on the multiple sets of correspondences. At block 908, one or more motion characteristics based on the optimized transformation are determined. And at block 910, the system controls the autonomous vehicle based on the one or more motion characteristics determined for the detected object.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The order or steps in the processes or blocks of operation may be performed in a different order or in parallel unless otherwise stated herein.

The invention claimed is:

1. A method for tracking objects by an autonomous vehicle, comprising:

receiving, by one or more computing devices of the autonomous vehicle, sensor data collected during a plurality of spins by a sensor of the autonomous vehicle including a first spin and a second spin, the sensor data including one or more clusters corresponding to one or more objects detected in an environment around the autonomous vehicle;

associating, by the one or more computing devices, a given cluster from the first spin to a given cluster from the second spin as corresponding to a given detected object of the one or more detected objects in the environment;

setting, by the one or more computing devices, a current estimated motion characteristic for the given detected object to an initial estimated value;

adjusting, by the one or more computing devices based on the current estimated motion characteristic, one or more points in the given cluster from the second spin and one or more points in the given cluster from the first spin to obtain adjusted clusters;

determining, by the one or more computing devices using a surface matching algorithm, an adjusted motion characteristic based on the adjusted clusters;

controlling, by the one or more computing devices, the autonomous vehicle based on the adjusted motion characteristic of the given detected object;

comparing, by the one or more computing devices, the current estimated motion characteristic with the adjusted motion characteristic;

determining, by the one or more computing devices, that the current estimated motion characteristic is within a predetermined tolerance with the adjusted motion characteristic; and determining, by the one or more computing devices based on determining that the current estimated motion characteristic is within the predetermined tolerance, that clusters having one or more points adjusted points and a current estimated velocity are accurate, wherein controlling the vehicle is further based on the determination that the adjusted clusters and the current estimated velocity are accurate.

2. The method of claim 1, wherein the first spin is a current spin of the sensor and the second spin is a prior spin last in time before the first spin.

3. The method of claim 1, wherein the first and second spins are due to rotation of the sensor about an axis.

4. The method of claim 1, wherein the adjusting includes moving at least one of the one or more points in the given cluster from the second spin or the one or more points in the given cluster from the first spin to account for a distorted representation of a detected object.

5. The method of claim 1, wherein the surface matching algorithm is an Iterative Closest Point algorithm.

6. The method of claim 1, wherein the adjusted motion characteristic is a velocity characteristic.

7. A method for tracking objects by an autonomous vehicle, comprising:

receiving, by one or more computing devices of the autonomous vehicle, sensor data including a first set of clusters collected from a first set of spins corresponding to a first tracking time point, and a second set of clusters collected from a second set of spins corresponding to a second tracking time point, wherein the first set of clusters and the second set of clusters all correspond to a detected object;

determining, by the one or more computing devices using a surface matching algorithm, multiple sets of correspondences between the first and second sets of clusters based on a transformation using an initial estimated motion characteristic for the detected object;

optimizing, by the one or more computing devices, the transformation between the first set of clusters and the second set of clusters based on the multiple sets of correspondences;

determining, by the one or more computing devices, one or more motion characteristics based on the optimized transformation; and controlling, by the one or more computing devices, the autonomous vehicle based on the one or more motion characteristics determined for the detected object.

8. The method of claim 7, further comprising:

transforming, by the one or more computing devices, the first set of clusters using the optimized transformation to generate a predicted second set of clusters;

comparing, by the one or more computing devices, the predicted second set of clusters with the second set of clusters; and determining, by the one or more computing devices, that distances between points in the predicted second set of clusters to corresponding points in the second set of clusters are within a predetermined threshold.

9. The method of claim 8, further comprising:

determining, by the one or more computing devices using the surface matching algorithm, new multiple sets of correspondences between the first set of clusters and the predicted second set of clusters based on the optimized transformation;

re-optimizing, by the one or more computing devices, the optimized transformation between the first set of clusters and the predicted second set of clusters based on the new multiple sets of correspondences; and determining, by the one or more computing devices, one or more new motion characteristics based on the re-optimized transformation;

wherein controlling the vehicle is further based on the one or more new motion characteristics.

10. The method of claim 7, further comprising:

determining, by one or more computing devices, that a spin rate of a sensor obtaining the sensor data is faster than a tracking rate, wherein determining the multiple sets of correspondences is based on the spin rate being faster than the tracking rate.

11. The method of claim 7, further comprising:

generating, by the one or more computing devices, multiple sets of hypotheses for the surface matching algorithm;

determining, by the one or more computing devices, a confidence level for each of the multiple sets of hypotheses;

selecting, by the one or more computing devices based on the confidence levels, a subset of the multiple sets of hypotheses, wherein the surface matching algorithm uses the subset of the multiple sets of hypotheses.

12. The method of claim 7, further comprising:

determining, by the one or more computing devices, that the detected object has a horizontal cross section with asymmetry meeting a set of predetermined rules; and determining, by the one or more computing devices, a yaw rate for the detected object based on the asymmetry meeting the set of predetermined rules.

13. The method of claim 7, further comprising:

accumulating, by the one or more computing devices, clusters from multiple spins associated as corresponding to the detected object into a merged cluster; and classifying, by the one or more computing devices, the detected object based on the merged cluster;

wherein controlling the vehicle is further based on the classification.

14. A system for operating a vehicle in an autonomous driving mode, the system comprising:

a driving system configured to cause the vehicle to perform driving actions while in the autonomous driving mode;

a perception system configured to detect objects in an environment around the vehicle; and a computing system having one or more processors and memory, the computing system being operatively coupled to the driving system and the perception system, the computing system being configured to:

receive sensor data collected during a plurality of spins by a sensor of the perception system, the plurality of spins including a first spin and a second spin, the sensor data including one or more clusters corresponding to one or more objects detected in the environment around the vehicle;

associate a given cluster from the first spin to a given cluster from the second spin as corresponding to a given detected object of the one or more detected objects in the environment;

set a current estimated motion characteristic for the given detected object to an initial estimated value;

adjust, based on the current estimated motion characteristic, one or more points in the given cluster from the second spin and one or more points in the given cluster from the first spin to obtain adjusted clusters;

determine, using a surface matching algorithm, an adjusted motion characteristic based on the adjusted clusters;

control the vehicle via actuation of the driving system based on the adjusted motion characteristic of the given detected object;

compare the current estimated motion characteristic with the adjusted motion characteristic;

determine that the current estimated motion characteristic is not within a predetermined tolerance with the adjusted motion characteristic, indicating that the current estimated motion characteristic has not converged with the adjusted motion characteristic;

upon indication that the current estimated motion characteristic has not converged with the adjusted motion characteristic:

update the current estimated motion characteristic; and compare the updated current estimated motion characteristic with the adjusted motion characteristic.

15. The system of claim 14, wherein upon determination that the current estimated motion characteristic is not within the predetermined tolerance, the computing system is configured to:

set the current estimated motion characteristic to be equal to the adjusted motion characteristic;

adjust, based on the current estimated motion characteristic, one or more points in the given cluster from the second spin and one or more points in the given cluster from the first spin;

determine, using the surface matching algorithm, a second adjusted motion characteristic based on the adjusted clusters; and compare, the current estimated motion characteristic with the second adjusted motion characteristic;

wherein control of the vehicle is further based on comparing the current estimated motion characteristic with the second adjusted motion characteristic.

16. The system of claim 14, further comprising the vehicle.

17. A system for operating a vehicle in an autonomous driving mode, the system comprising:

a driving system configured to cause the vehicle to perform driving actions while in the autonomous driving mode;

a perception system configured to detect objects in an environment around the vehicle; and a computing system having one or more processors and memory, the computing system being operatively coupled to the driving system and the perception system, the computing system being configured to:

receive, from a sensor of the perception system, sensor data including a first set of clusters collected from a first set of spins corresponding to a first tracking time point, and a second set of clusters collected from a second set of spins corresponding to a second tracking time point, wherein the first set of clusters and the second set of clusters all correspond to a detected object;

determine, using a surface matching algorithm, multiple sets of correspondences between the first and second sets of clusters based on a transformation using an initial estimated motion characteristic for the detected object;

optimize the transformation between the first set of clusters and the second set of clusters based on the multiple sets of correspondences;

determine one or more motion characteristics based on the optimized transformation; and control the vehicle via actuation of the driving system based on the one or more motion characteristics determined for the detected object.

\* \* \* \* \*